2,723,958

ZINC PHOSPHATE PHOSPHORS

Francis N. Shaffer and Alden B. Davis, Towanda, Pa., assignors to Sylvania Electric Products Inc., Salem, Mass., a corporation of Massachusetts No Drawing. Application April 10, 1951,
Serial No. 220,342

1 Claim. (Cl. 252—301.6)

This invention relates to phosphors for excitation by ultraviolet radiation, cathode rays and the like.

In an application Serial No. 220,341 filed of even date herewith, we describe a tin-activated zinc phosphate phosphor, which fluoresces a white to orange color under ultraviolet excitation. The present application is concerned with the replacement of part of the zinc by barium or strontium, which gives a remarkable enhancement of the blue emission from the phosphor. At the same time, the red emission is reduced, so that the color changes from white or orange to a very bright blue.

Efficient blue phosphors are obtained with zinc-to-barium ratios between about 3 to 1 and about 1.5 to 1. Smaller zinc-to-barium ratios give a more whitish blue obtained at a ratio of about 1 to 6, but the blue becomes deep again at ratios below 1 to 25. For each two moles of the phosphate radical, the amount of zinc plus barium or strontium can be between 2.9 and 2.2 gram-atoms.

Maximum fluorescence is obtained at tin contents smaller than for the zinc phosphate phosphors without barium or strontium, and the output is substantially constant from just above 0.03 gram-atom of tin to just below 0.20 gram-atom of tin, for each 2.0 gram-moles of the phosphate radical.

Tin must be present in the phosphor in the stannous state in order to obtain fluorescence under 2537 A. U. radiation. This stannous tin may be obtained and controlled by the use of a controlled atmosphere during firing as described in our copending application of even date herewith. One method and a variation from those previously described is to include in the phosphor mixture, a compound which will decompose during the firing of the phosphor and give off a gas or vapor which will maintain the tin in a stannous state. We have found that in certain compositions when zinc ammonium phosphate is used as a component of the mix, the ammonia evolved during firing effectively maintains the tin in a stannous state. This method necessitates firing in covered containers but permits firing in large crucibles or thick layers since the desired atmosphere is generated within the phosphor mix and does not have to penetrate the mix from the outside. We find this method of firing in covered crucibles satisfactory for compositions close to that given below, which is one of our preferred compositions for obtaining an efficient blue phosphor:

Zinc _____ 2.0 gram atoms
Barium or strontium _____ 0.7 gram atoms
Tin _____ .05 gram atoms
Phosphate (PO4) _____ 2.00 gram mols In preparing phosphors according to the invention, the materials used should be of the high degree of purity recognized as necessary for preparation of efficient phosphors. We prefer to use zinc ammonium phosphate, zinc oxide, stannous oxide, dibarium hydrogen phosphate, barium carbonate, distrontium hydrogen phosphate and strontium carbonate as starting materials. Other material may be used to obtain similar results. Oxides of strontium and barium or compounds of zinc, strontium and barium which break down to the oxide upon firing could undoubtedly be used as well as tri-zinc, tri-strontium, tri-barium, and ammonium phosphates. Tin as stannic oxide or as the phosphate, halide, or a compound reducible by heat to the oxide may be used.

These materials in the correct proportions are mixed together thoroughly by pebble milling dry or in a liquid medium or by any other suitable method. Mixes prepared by wet methods are oven dried. The dry mix is then fired at a temperature between 1200° F. and 2200° F. depending upon the ratio of zinc to barium used in the phosphor. Phosphors with high barium to zinc ratios require firing at the top of the temperature range while phosphors with high zinc to barium ratios require firing at lower temperatures to prevent fusion. These phosphors may be single fired in a controlled atmosphere or prefired in air and refired in the controlled atmosphere as described in our copending application of even date herewith. They may also be fired in an atmosphere of steam+nitrogen+hydrogen, or by the method described above whereby ammonia vapor evolved from the phosphor mix is used to keep the tin in the stannous state.

EXAMPLE 1

In one embodiment of our invention, a tin-activated zinc barium phosphate phosphor fluorescing blue is prepared, having the following composition:

Zinc _____ 1.8 gram atoms
Barium _____ .9 gram atoms
Tin _____ .05 gram atoms
Phosphate (PO4) _____ 2.00 gram mols In making this phosphor, the starting ingredients are intimately mixed as fine powders in the following proportions:

Zinc ammonium phosphate _____ 32.1 grams
Dibarium hydrogen phosphate _____ 4.66 grams
Barium carbonate _____ 13.82 grams
Stannous oxide _____ 0.67 gram The above ingredients are ground in a mortar and baked for several hours at about 850° C. to remove all ammonia and other gases that would be evolved from the materials in the mix. After baking, the material is again ground in a mortar and refired in a covered porcelain crucible for about one-half hour at 1400° F. in an atmosphere of about 12% hydrogen and 88% nitrogen. The material was then allowed to cool in the same controlled atmosphere.

EXAMPLE 2

4300. grams of zinc ammonium phosphate; 1660. grams of barium carbonate, and 81.0 grams of stannous oxide are blended and pulverized to obtain an intimate mixture. This mixture is fired in air in covered silica crucibles for six hours at 1525° F. The cake is then broken up and pebble milled in acetone for one-half hour to reduce aggregates. After the material is dried and sieved it is suitable for use in suspensions as they are prepared for use in fluorescent lamps.

This phosphor gives a very saturated blue fluorescence under excitation by 2537 A. U.

EXAMPLE 3

7.93 grams of dibarium hydrogen phosphate, 2.34 grams of barium carbonate, 1.05 grams of zinc ammonium phosphate, 0.168 gram of zinc oxide, and 0.135 gram of stannous oxide are mortared together. This mix is fired in an open porcelain crucible in an atmosphere of steam and nitrogen with approximately 4% by volume of hydrogen for one-half hour at 1980° F. The sample is allowed to cool in the same controlled atmosphere.

This phosphor fluoresces a blue white under 2537 A. U. excitation.

EXAMPLE 4

35.82 grams of zinc ammonium phosphate; 10.34 grams of strontium carbonate, and 0.67 gram of stannous oxide are mortared together and fired in a covered porcelain crucible for one hour at 1450° F.

This phosphor fluoresces blue under 2537 A. U.

EXAMPLE 5

13.21 grams of finely ground diammonium hydrogen phosphate; 7.32 grams of zinc oxide; 8.89 grams of barium carbonate, and 0.38 gram of stannous oxide are thoroughly mixed by mortaring. The mix is fired in a covered porcelain crucible in air for one-half hour at 1550° F. This phosphor fluoresces blue under 2537 A. U.

The foregoing examples are given as specific embodiments of the invention, and the proportions and preparation of the phosphor, including the composition of the controlled atmosphere, can be varied within the limits of the invention.

The emission variation with change in the mol ratio of zinc plus barium to the phosphate radical is shown in the table below, the composition being given in gram-atoms and gram-moles, and the relative emission being taken using a Zeiss-Pulfrich photometer through red, green and blue filters, the excitation in each case being a constant standard source of ultraviolet radiation rich in 2537 Angstrom mercury wavelength:

Table I

| Composition | | | | | Relative Emission | | |
|---|---|---|---|---|---|---|---|
| Zn | Ba | Sn | PO$_4$ | (Zn+Ba)/2(PO$_4$) | Red | Green | Blue |
| 2.00 | 0.7 | .05 | 1.8 | 3.00 | 4 | 78 | 157 |
| 2.00 | 0.7 | .05 | 2.0 | 2.70 | 6 | 88 | 212 |
| 2.00 | 0.7 | .05 | 2.2 | 2.45 | 4 | 91 | 250 |
| 2.00 | 0.7 | .05 | 2.4 | 2.25 | 5 | 86 | 203 |
| 2.00 | 0.7 | .05 | 2.6 | 2.07 | 5 | 77 | 134 |

The peak blue fluorescence is seen to occur at a ratio of zinc plus barium to the phosphate radical of 2.45.

The variation in fluorescence with change in the tin content is shown by the following table, taken under the same conditions as before:

Table II

| Composition | | | | Relative Emission | | |
|---|---|---|---|---|---|---|
| Zn | Ba | Sn | PO$_4$ | Red | Green | Blue |
| 2.00 | .7 | .01 | 2.00 | 2 | 53 | 51 |
| 2.00 | .7 | .025 | 2.00 | 2 | 65 | 138 |
| 2.00 | .7 | .05 | 2.00 | 3 | 79 | 203 |
| 2.00 | .7 | .075 | 2.00 | 3 | 80 | 205 |
| 2.00 | .7 | .10 | 2.00 | 3 | 79 | 203 |
| 2.00 | .7 | .15 | 2.00 | 3 | 72 | 208 |
| 2.00 | .7 | .20 | 2.00 | 4 | 75 | 174 |

Unlike the zinc phosphate without the addition of barium or strontium, no appreciable gain in fluorescence occurs for tin concentration above 0.05 gram-atom per two gram moles of the phosphate radical.

The table below shows the effect on light emission of variations in the zinc to barium ratio, the data being taken as before:

Table III

| Composition | | | | Firing Temperature, ° F. | Relative Emission | | |
|---|---|---|---|---|---|---|---|
| Zn | Ba | Sn | PO$_4$ | | Red | Green | Blue |
| 2.70 | ---- | .05 | 2.00 | 1,400 | 33 | 70 | 60 |
| 2.60 | 0.10 | .05 | 2.00 | 1,400 | 16 | 69 | 76 |
| 2.40 | 0.30 | .05 | 2.00 | 1,400 | 12 | 78 | 120 |
| 2.20 | 0.50 | .05 | 2.00 | 1,400 | 12 | 78 | 125 |
| 2.00 | 0.7 | .05 | 2.0 | 1,400 | 6 | 88 | 212 |
| 1.60 | 1.10 | .05 | 2.00 | 1,775 | 7 | 79 | 95 |
| 1.20 | 1.50 | .05 | 2.00 | 1,775 | 16 | 88 | 85 |
| .80 | 1.90 | .05 | 2.00 | 1,775 | 20 | 87 | 81 |
| .40 | 2.30 | .05 | 2.00 | 1,980 | 27 | 83 | 80 |
| .10 | 2.60 | .05 | 2.00 | 1,980 | 11 | 72 | 100 |

The first phosphor has no strontium or barium and fluoresces orange. The emission readings show that as barium is added in increasing amounts the red emission decreases and the blue emission increases to a maximum of about 2.00 moles of zinc to 0.7 mole of barium. With further increases in barium the red emission increases and the blue emission decreases until 0.4 gram atoms of zinc and 2.30 of barium is reached. As the barium to zinc ratio is further decreased the blue emission increases again.

The phosphors in Tables I and III were fired in an atmosphere of about 88% nitrogen and 12% hydrogen; the phosphor of Table II in an atmosphere maintained by the evolution of ammonia from the phosphor mix, as previously described. The phosphor of Table I was fired at 1400° F.; that of Table II at 1525° F.

What we claim is:

A zinc phosphate phosphor activated by tin in the stannous state and in which part of the zinc is replaced by a metal selected from the group consisting of barium and strontium, the number of gram-atoms of zinc plus said other metal being between 2.9 and 2.2 gram-atoms per two gram-moles of the phosphate radical, the molal amount of zinc being at least 1/25 as great but not more than three times as great as that of the metal selected from the group recited, the stannous tin content of the phosphor being between 0.03 and 0.20 gram-atoms of tin for each two grams of the phosphate radical.

References Cited in the file of this patent
UNITED STATES PATENTS
2,270,124    Hiniger _____ Jan. 13, 1942